No. 738,299. PATENTED SEPT. 8, 1903.
W. M. DEAL.
COMBINED RAIL AND WHEEL CAR BRAKE.
APPLICATION FILED JULY 16, 1902.
NO MODEL. 5 SHEETS—SHEET 1.

No. 738,299. PATENTED SEPT. 8, 1903.
W. M. DEAL.
COMBINED RAIL AND WHEEL CAR BRAKE.
APPLICATION FILED JULY 16, 1902.
NO MODEL. 5 SHEETS—SHEET 2.

WITNESSES:
Chas. G. Hensel
C. L. Bassler

INVENTOR
Wm. M. Deal.
BY
Wm. R. Gerhart
ATTORNEY.

No. 738,299. PATENTED SEPT. 8, 1903.
W. M. DEAL.
COMBINED RAIL AND WHEEL CAR BRAKE.
APPLICATION FILED JULY 16, 1902.
NO MODEL. 5 SHEETS—SHEET 3.

WITNESSES:
Chas. G. Hensel.
C. G. Bassler.

INVENTOR
Wm. M. Deal.
BY
Wm. R. Gerhart
ATTORNEY.

No. 738,299. PATENTED SEPT. 8, 1903.
W. M. DEAL.
COMBINED RAIL AND WHEEL CAR BRAKE.
APPLICATION FILED JULY 16, 1902.
NO MODEL. 5 SHEETS—SHEET 5.

WITNESSES:
Chas. G. Hensel.
C. G. Bassler

INVENTOR
Wm. M. Deal.
BY Wm. R. Gerhart
ATTORNEY.

No. 738,299. Patented September 8, 1903.

UNITED STATES PATENT OFFICE.

WILLIAM M. DEAL, OF PHILADELPHIA, PENNSYLVANIA, ASSIGNOR, BY DIRECT AND MESNE ASSIGNMENTS, TO JOSEPH F. CULLMAN, OF NEW YORK, N. Y., AND JOHN F. BRIMMER, OF LANCASTER, PENNSYLVANIA.

COMBINED RAIL AND WHEEL CAR-BRAKE.

SPECIFICATION forming part of Letters Patent No. 738,299, dated September 8, 1903.

Application filed July 16, 1902. Serial No. 115,782. (No model.)

*To all whom it may concern:*

Be it known that I, WILLIAM M. DEAL, a citizen of the United States, and a resident of Philadelphia, in the county of Philadelphia, State of Pennsylvania, have invented certain Improvements in a Combined Rail and Wheel Car-Brake, of which the following is a specification.

This invention relates to improvements in brakes for cars wherein are combined a brake on the rail and a brake on the wheel; and the objects of my improvements are, first, to so connect the two brakes that the application of one will also apply the other; second, to hold the rail brake-shoe parallel with the rail in all its movements; third, to automatically take up the wear of the rail brake-shoe, and, fourth, to so construct the brakes that those on opposite sides of a truck will act independently the one of the other.

This invention consists in the construction and combination of the various parts, as will be hereinafter fully described and then pointed out in the claims.

In the accompanying drawings, forming a part of this specification, Fig. 2, a top plan view of the brake-carrying frame and its connections, and Fig. 3 a side view of both wheels of a single truck having attached thereto brakes embodying my invention. Fig. 27, an elevation of the inner side of the connection between the upper end of the brake-lever and the rail-brake-shoe adjuster, showing in full lines the position of the parts when a new shoe has just been put in place and in broken lines the same parts after the rail brake-shoe is worn and the adjuster is about to lower the said shoe. In Figs. 1, 2, 3, and 4 all the parts are shown in the positions occupied thereby when the brake-shoes are applied.

Similar numerals indicate like parts throughout the several views.

Referring to the details of the drawings, 1 indicates the wheels of the truck, 2 the side bars, and 73 a cross-bar connecting the side bars. The wheel is embraced by a brake-frame comprising an outside straight bar 3 and an inside bar 5, having an offset 6. The inner end of bar 5 is drawn toward bar 3, as shown at 7, to form a bearing from which is supported the rail brake-shoe, to be described, and the outer end of said bar 5 is similarly drawn toward bar 3, as shown at 8, to support the wheel brake-shoe on the side of the wheel opposite to that on which is placed the rail brake-shoe. The rail brake-shoes on opposite sides of the truck are supported by a yoke, comprising a transverse bar 9 and posts 10, resting on and bolted to the side bars 2 of the truck. Bar 9 passes through a slot in adjuster-frames 11. Each of these adjuster-frames consists of a base 12 and posts 13, with inwardly-projecting lips 14, forming a channel, through which passes transverse bar 9. Above bar 9, in said channel and resting on said bar, is the base 15 of a horizontally-disposed cam-block 16, having depending lips 17, that embrace bar 9. The body of cam-block 16 is tubular in form, the lower end of which tube is formed with the base 15, and on the upper end of said body are sloping faces 18, ending in horizontal surfaces 75, that terminate in similarly-disposed shoulders 19. The upper end of cam-block 16 supports cam-block 20, the lower end whereof has sloping faces 76, ending in horizontal surfaces 77, that terminate in similarly-disposed shoulders 21, forming, respectively, the counterparts of said sloping faces 18, horizontal surfaces 75, and shoulders 19. Through the openings in the cam-blocks and an opening registering therewith through base 12 of the adjuster-frame passes a hanger 22, having on the lower end thereof a horizontal tubular bearing 23. Through tubular bearing 23 passes a bolt 29, and to each end of this bolt is pivoted a depending link 30. The lower ends of these links embrace the inner end of bar 3 and the end 7 of bar 5 of the brake-frame and are connected therewith by a transverse hinge-pin 31, passing through the links and the said ends of the side bars of the brake-frame. This hinge-pin 31 also forms one of the fulcrums of the brake-lever to be described.

Below the ends 7 of bars 5 and the corresponding ends of bars 3 are located rail brake-blocks 32. These rail brake-blocks consist of side plates 33, top binding-loops 34, the bottom plates 28, and a plate 35, connecting the ends of side plates 33 adjacent to the wheel. The top and bottom 36 and 37, respectively, of the end of the said rail brake-block are beveled to prevent interference with the wheel above and to assist the rail brake-shoe in surmounting obstacles. The rail brake-block is connected with the inner end of bar 3 and the end 7 of bar 5 of the brake-frame by links 38, pivoted at 39 to the rail brake-block and at 40 to said brake-frame, the pivot-pins 39 engaging bearings 46 in the side walls.

The action of the brake-frame, the rail brake-block, and of the wheel brake-block, to be described, are controlled by a brake-lever 41, and a single brake-lever is applied to each brake-frame and the rail brake-block carried thereby, and each of said brake-levers is adapted to act independently of any and all similar brake-levers on the car. Brake-lever 41 is fulcrumed on hinge-pin 31, and its lower arm 42 is connected with the rail brake-block through a pin 43, passing through bearings 44 of rail brake-block 32. Through the upper end of brake-lever 41 passes a pin or bolt 78, that engages a slot 79 in the outer end of a rod 45, the other end of which rod is pivoted to the outer end of a lever 24 on the upper end of hanger 22. Lever 24 bears against the shoulder 74 on the outer end of cam-block 20, whereby said cam-block 20 is caused to travel around and over cam-block 16, for the purpose to be described.

Figures 6, 7, 8, 9, 10:
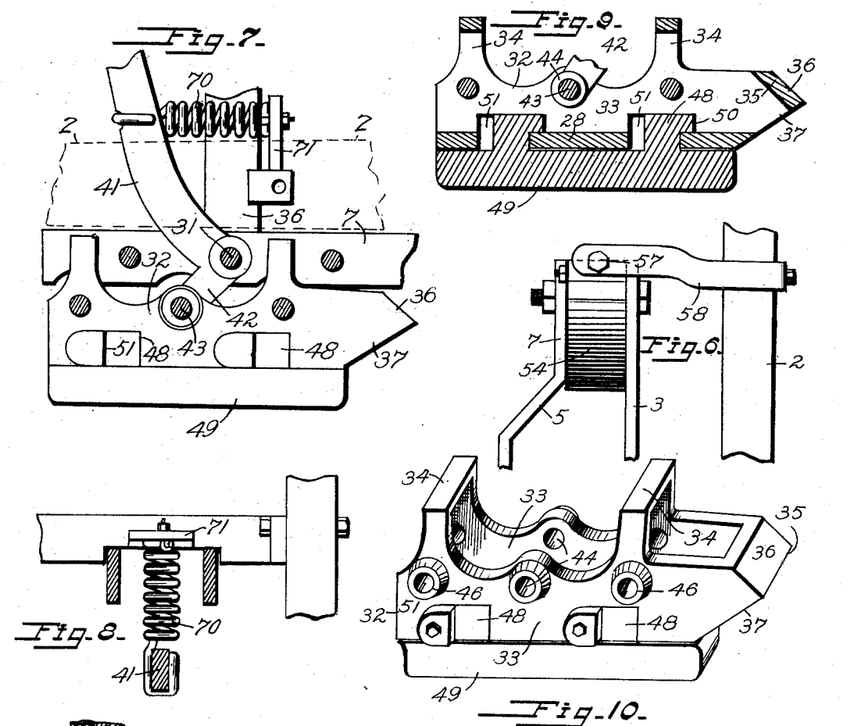
Fig. 6, a top plan view of the end of the brake-carrying frame supporting the wheel brake-shoe.
Fig. 7 is a side view of the rail brake shoe and block, showing the brake-lever connection, but with the front ends of the connecting-pins in section.
Fig. 8, a top plan view of the brake-lever and its retracting device.
Fig. 9, a longitudinal vertical section of the rail brake shoe and block.
Fig. 10, a perspective view of the rail brake block and shoe.
Figure 11:
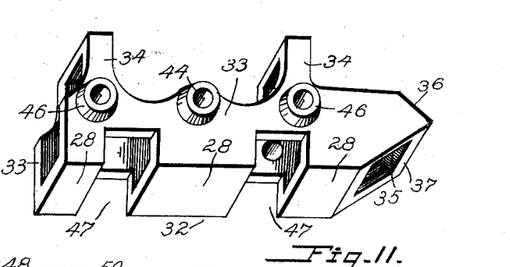
Fig. 11, a bottom perspective view of the rail brake-block.
Figure 12:
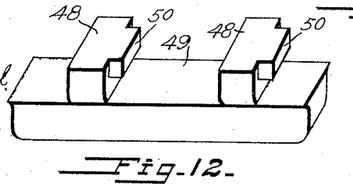
Fig. 12, a top perspective view of the rail brake-shoe, and Fig. 13 a perspective view of the lower end of the brake-lever.
Figure 13:
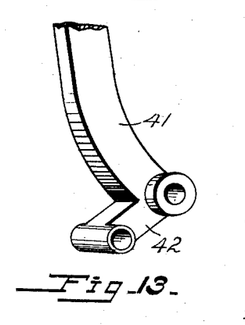
Figure 19:
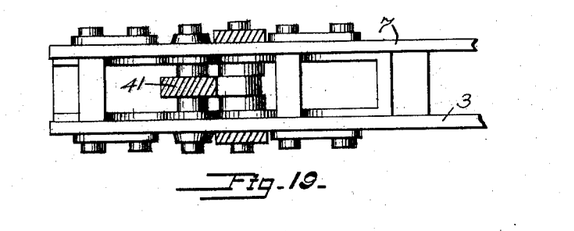
Fig. 19 is a horizontal section on broken line D D of Fig. 1.
Figure 20:
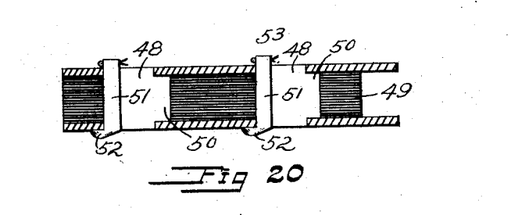
Fig. 20 is a horizontal section on broken line E E of Fig. 1.
Figure 21:
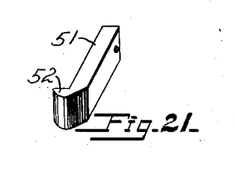
Fig. 21 is a perspective view of the filling-pin locking the shoe in place.
Figures 22, 26:
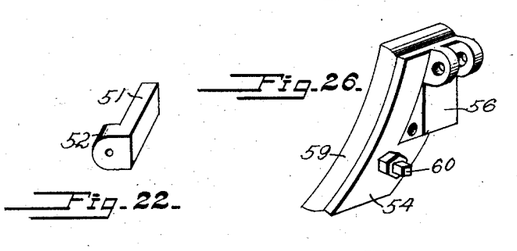
Fig. 22 is a perspective view of a modification of said filling-pin.
Fig. 26 is a rear perspective view of the wheel brake-block with the wheel brake-shoe attached thereto.
Figures 23, 25:
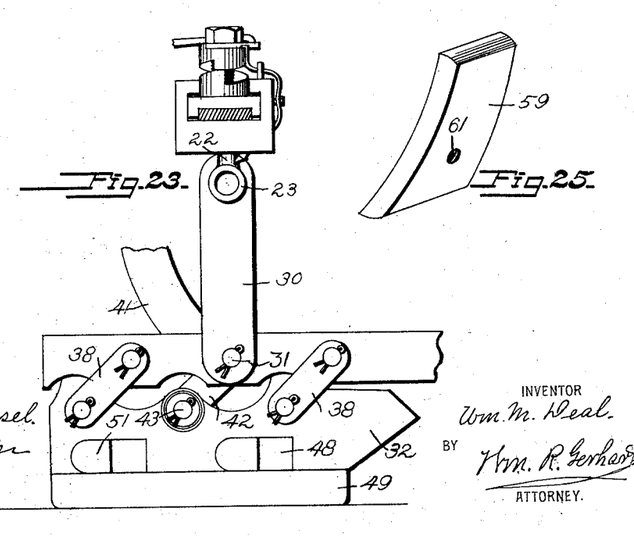
Fig. 23 is a section on broken line F F of Fig. 4.
Fig. 25 is a rear perspective view of the wheel brake-shoe.

Rail brake-block 32 has transverse passages or grooves 47 through the bottom thereof. These grooves are engaged by transverse ribs 48 on the rail brake-shoe 49, having horizontally-extending lips 50. Said ribs and their lips 50 are adapted to be engaged sidewise with the grooves 47, after which said shoe is moved in the rail brake-block toward the wheel 1, whereby the lips 50 take over the bottom plates 28 of rail brake-blocks 32, thus securing the rail brake-shoe to the rail brake-block, as illustrated in Fig. 9. After lips 50 are engaged with the bottom plates of the rail brake-blocks, the rail brake-shoes are secured in place by filling-pins 51, driven through grooves 47, behind ribs 48. Each of these filling-pins has a head 52 on one end and is secured by a key 53 at the other end. By this construction the rail brake-shoes can be removed and replaced without specially raising or detaching the rail brake-block for that purpose.

54 indicates the wheel brake-block, pivoted on a bolt 55, passing through a lug 56 on said brake-block and the end 8 of bar 5 and the corresponding end of bar 3 of the brake-frame. The upper end of said block 54 is upheld by a hanger 57, depending from an arm 58, extending inward from bar 3 of the brake-frame. The outer end of the said brake-frame is also supported by hanger 57 through the wheel brake-block 54, as shown in the drawings.

59 indicates a wheel brake-shoe held to the inner face of wheel brake-block 54 by a bolt 60, screwed through said brake-block and having its inner end engaging threaded socket 61 in the back of the wheel brake-shoe.

Figure 1:
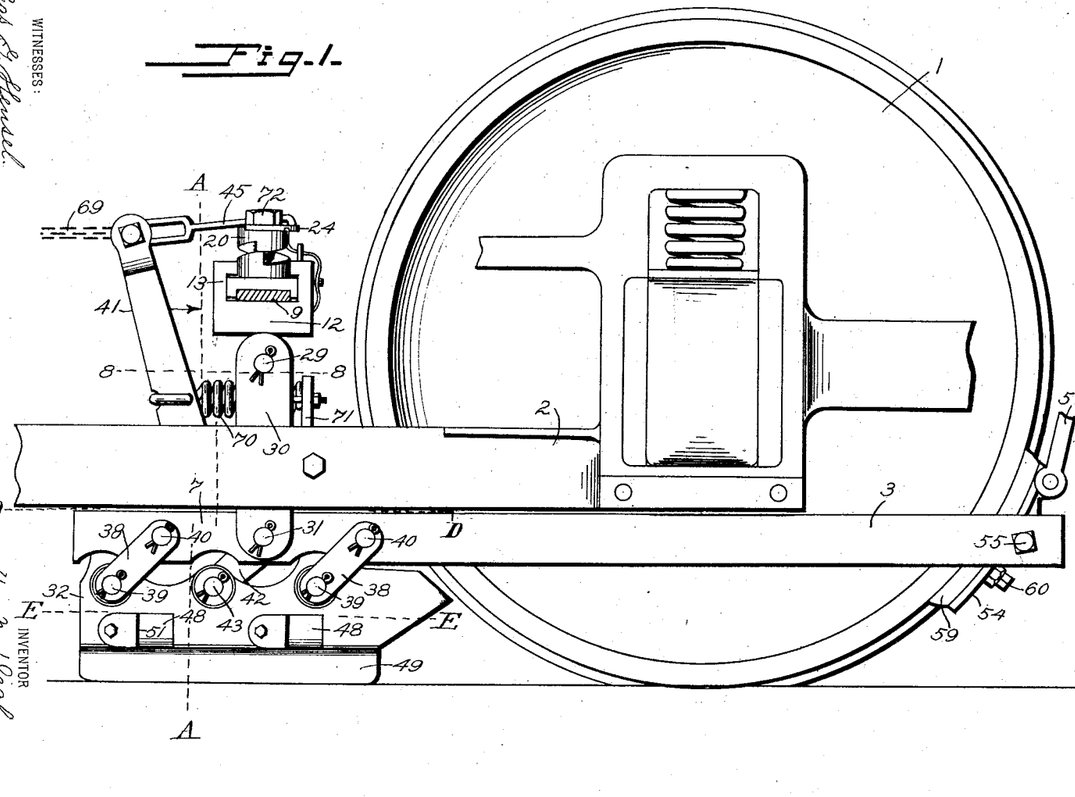
Figure 1 is a side elevation of a wheel of a single truck having attached thereto a brake embodying my invention, parts being cut away.
Figures 2, 3, 27:
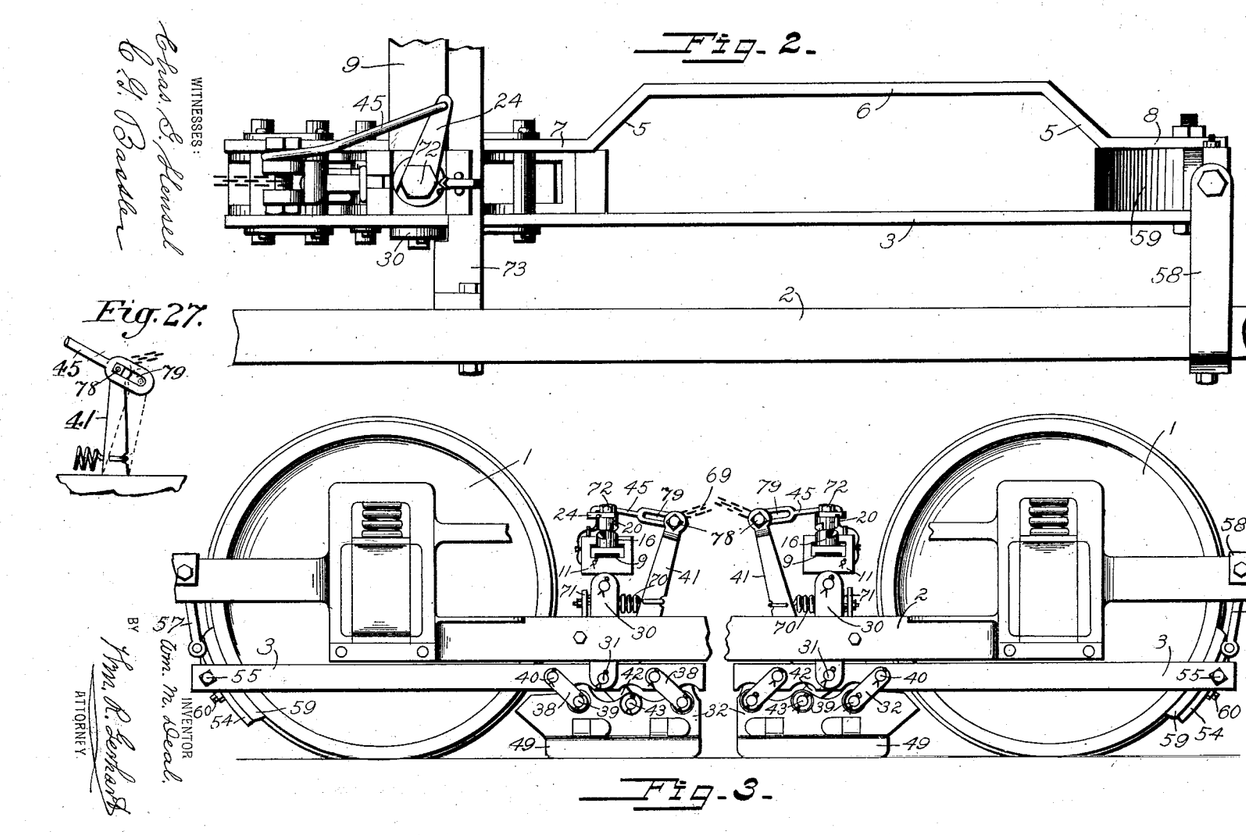
Figures 4, 5, 14, 15, 16, 17, 18, 24:
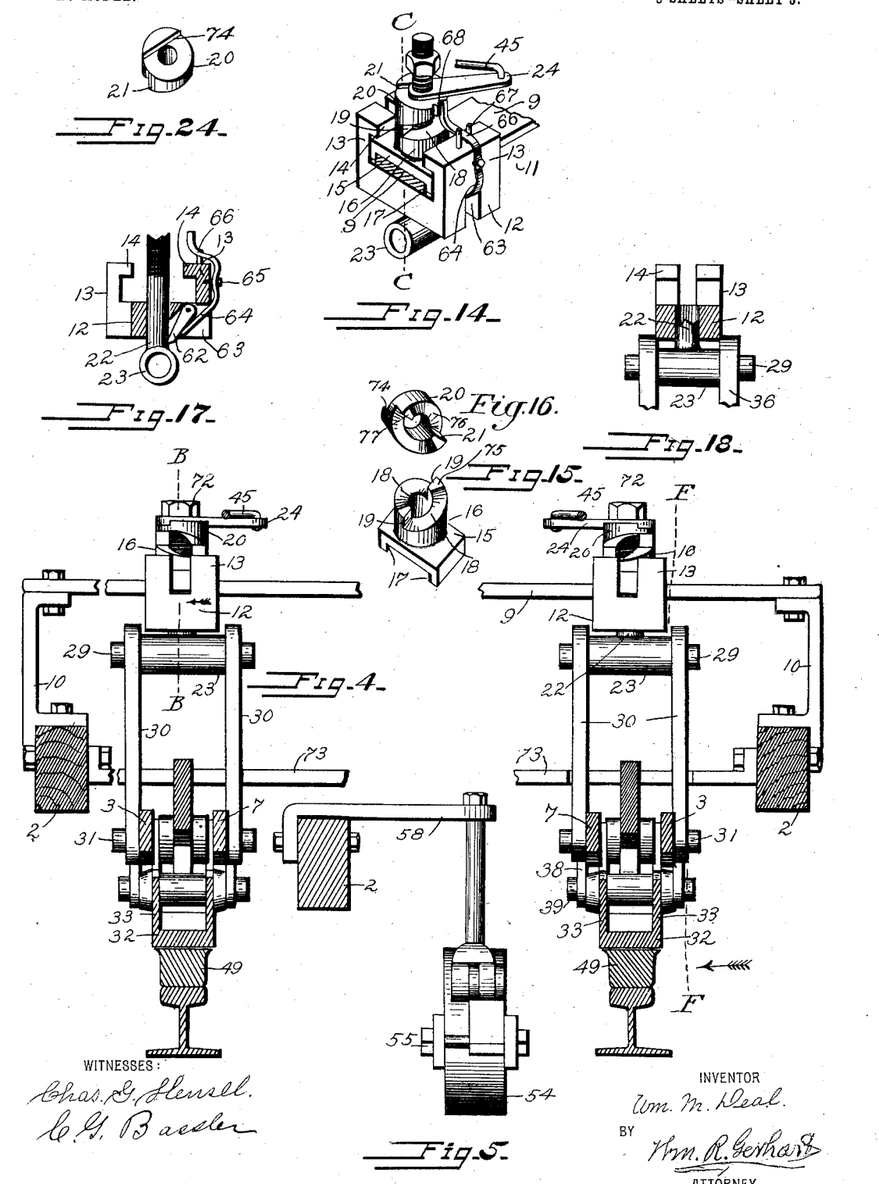
Fig. 4 is a vertical transverse section on broken line A A of Fig. 1.
Fig. 5 is a rear elevation of the wheel brake-shoe, the side bar of the truck-frame being shown in section.
Fig. 14 is a top perspective view of the rail-shoe adjuster.
Fig. 15, a top perspective view of the lower cam-block of the rail-shoe adjuster.
Fig. 16, a bottom perspective view of the upper cam-block of said adjuster.
Fig. 17, a vertical section on broken line B B of Fig. 4, showing the mechanism for preventing upward movement of the hanger.
Fig. 18, a vertical section on broken line C C of Fig. 14, showing the connection between the hanger and the tubular bearing.
Fig. 24 is a top perspective view of the upper cam-block of the adjuster.

Upward movement of hanger 22 is prevented by a dog 62, pivoted in a recess 63 in base 12 of the adjuster-frame, the point of which dog engages and bites into said hanger under pressure of the end 64 of a spring, secured at its center to the side of the adjuster-frame by a pin 65. The upper end 66 of said spring passes upward between two studs 67 on top of one of the posts 13, and thence curves upward and engages a stud 68 on cam-block 20, so as to act against the tension of brake-lever 41, all as shown in Figs. 14 and 17.

The brake is operated by an ordinary brake mechanism through brake-chains 69, and the brakes are applied by tension, as is usual in such cases.

In operation tension being applied to brake-chain 69 the upper arm of brake-lever 41 is drawn away from the wheel and acts through fulcrum-pin 31 and lower lever-arm 42 to force the rail brake-shoe down on the rail. In this movement the bottom of said shoe is at all times parallel with the top of the rail by reason of the connection of the rail brake-block with bars 3 and 5 of the brake-frame by the similarly-acting links 38. As soon as friction is produced between the rail brake-shoe and the rail the continued tension on the upper arm of lever 41, which now has pin 43 as its fulcrum, draws the brake-frame in the direction of the brake-lever through pin 31 and applies the wheel brake-shoe to the wheel. When the use of a new rail brake-shoe begins, the horizontal surfaces 77 of cam-block 20 rest on the corresponding surfaces 75 of cam-block 16, and the bolt 78 is engaged in the inner end of slot 79 of rod 45. As the brake-lever is drawn away from the wheel by the application of the brake-shoes bolt 78 is moved outward somewhat in said slot, but without reaching the end thereof and without disturbing the original position of cam-block 20 on cam-block 16. By the wear of the rail brake-shoe bolt 78 is moved farther outward in slot 79 with each throw of the brake-lever in applying the brake-shoes. Finally, bolt 78 engages the end of slot 79 and turns cam-block 20 on cam-block 16 until the shoulders on the upper cam-block pass over and drop in front of those on the lower cam-block, dropping the rail brake-shoe proportionately. After the tension on the brake-lever is relaxed the said lever and the parts connected therewith are retracted to their normal positions by a spring 70, secured to a post 71. After the rail brake-shoe has been lowered to the limit of the action of the mechanism for that purpose and said shoe is worn out the parts are raised by screwing down a nut 72 on the upper end of hanger 22 and by turning upper cam-block 20 backward, so that the sloping faces 76 of said cam-block 20 may climb up the sloping faces 18 of cam-block 16 until the horizontal surfaces 77 of cam-block 20 again rest on horizontal surfaces 75 of cam-block 16, whereby the rail brake-block is raised. This being done, filling-pins 51 are withdrawn, and then the rail brake-shoe is removed by pulling it toward the outer end of the rail brake-block until lips 50 have cleared their respective sections of the bottom plate 28. The removal of the rail brake-shoe can thus be effected without any special elevation of the rail brake-block. All that is necessary is that said brake-block should be in its normally elevated position, so that the new rail brake-shoe may be engaged therewith without contacting with the rail. When the engagement of the new rail brake-shoe with the rail brake-block is completed, said brake-shoe is in its normally elevated and operative position.

I do not limit myself to any particular construction of brake-blocks, brake-shoes, or adjusters for the rail brake-shoes, neither do I restrict myself to the construction and arrangement of the other parts herein shown and described, as it is obvious that many alterations may be made therein without departing from the principle and scope of my invention.

Having thus described my invention, what I claim as new, and desire to secure by Letters Patent, is—

1. The combination, in a car-brake, of a rail brake-shoe, a wheel brake-shoe, a connection between the brake-shoes, and a brake-lever fulcrumed on said connection.

2. The combination, in a car-brake, of a rail brake-shoe, a wheel brake-shoe, a movable connection between the brake-shoes, and a brake-lever fulcrumed on said connection.

3. The combination, in a car-brake, of a rail brake-shoe, a wheel brake-shoe, a movable connection between the brake-shoes, and a brake-lever fulcrumed on said connection and above the rail brake-shoe.

4. The combination, in a car-brake, of a frame, a rail brake-shoe and a wheel brake-shoe connected with said frame, a brake-lever, and an operating connection between the brake-lever, said frame, and the rail brake-shoe.

5. The combination, in a car-brake, of a frame, a rail brake-shoe and a wheel brake-shoe connected with said frame, a fulcrum wherethrough the brake-lever actuates one of the brake-shoes, and a second fulcrum wherethrough the same brake-lever actuates the other brake-shoe.

6. The combination, in a car-brake, of a movable frame, a rail brake-shoe and a wheel brake-shoe connected with the movable frame, a brake-lever, a fulcrum wherethrough the brake-lever actuates one of the brake-shoes, and a second fulcrum wherethrough the said lever actuates the other brake-shoe through the movable frame.

7. The combination, in a car-brake, of a movable frame, a rail brake-shoe and a wheel brake-shoe connected with the movable frame, a brake-lever, a fulcrum wherethrough the brake-lever actuates the rail brake-shoe, and a second fulcrum wherethrough the said lever actuates the wheel brake-shoe through the movable frame.

8. The combination, in a car-brake, of a rail brake-shoe, a wheel brake-shoe, a movable connection between the brake-shoes, a brake-lever fulcrumed on said connection, and a connection between the brake-lever and one of the brake-shoes.

9. The combination, in a car-brake, of a rail brake-shoe, a wheel brake-shoe, a movable connection between the brake-shoes, a brake-lever fulcrumed on one of the brake-shoes, and a connection between the brake-lever and said connection between the brake-shoes.

10. The combination, in a car-brake, of a rail brake-shoe, a wheel brake-shoe, a movable connection between the brake-shoes, a brake-lever fulcrumed on said connection, and a connection through a fulcrum-pin between one of the brake-shoes and the brake-lever.

11. The combination, in a car-brake, of a rail brake-shoe, a wheel brake-shoe, a movable connection between the brake-shoes, a brake-lever fulcrumed on said connection, and a connection through a fulcrum-pin between the brake-lever and the rail brake-shoe.

12. The combination, in a car-brake, of a rail brake-shoe, a wheel brake-shoe, a movable connection between the brake-shoes, a brake-lever fulcrumed between its arms in said connection, and a connection through a fulcrum-pin between one of the brake-shoes and an arm of said lever.

13. The combination, in a car-brake, of a rail brake-shoe, a wheel brake-shoe, a movable connection between the brake-shoes, a brake-lever fulcrumed between its arms in said connection, and a connection through a fulcrum-pin between one of the brake-shoes and the shorter arm of said lever.

14. The combination, in a car-brake, of a rail brake-shoe, a wheel brake-shoe, a movable connection between the brake-shoes, a brake-lever fulcrumed between its arms in said connection, and a connection through a fulcrum-pin between the rail brake-shoe and an arm of the lever.

15. The combination, in a car-brake, of a rail brake-shoe, a wheel brake-shoe, a connection between the brake-shoes, hinged links supporting the connection between the brake-shoes, a brake-lever fulcrumed on said connection, and a connection through a fulcrum-pin between one of the brake-shoes and the brake-lever.

16. The combination, in a car-brake, of a rail brake-shoe, a wheel brake-shoe, a connection between the brake-shoes, hinged links supporting the connection between the brake-shoes, a brake-lever fulcrumed on said connection, and a connection through a fulcrum-pin between the rail brake-shoe and the brake-lever.

17. The combination, in a car-brake, of a rail brake-shoe on one side of a wheel, a wheel brake-shoe on the other side of the wheel, a connection between the brake-shoes, a brake-lever, an operating connection between the brake-lever and the rail brake-shoe, and an operating connection between the same brake-lever and said connection, whereby the application of one of the brake-shoes acts to apply the other brake-shoe.

18. The combination, in a car-brake, of a rail brake-shoe on one side of a wheel, a wheel brake-shoe on the other side of the wheel, a movable connection between the brake-shoes, a brake-lever, and an operating connection between the brake-lever, the rail brake-shoe, and the movable connection, whereby the application of the rail brake-shoe acts through the movable connection to apply the wheel brake-shoe.

19. The combination, in a car-brake, of a rail brake-shoe on one side of a wheel, a wheel brake-shoe on the other side of the wheel, a movable connection between the brake-shoes, a brake-lever fulcrumed between its arms in said connection, and a connection through a fulcrum-pin between one of the brake-shoes and an arm of said lever.

20. The combination, in a car-brake, of a rail brake-shoe on one side of a wheel, a wheel brake-shoe on the other side of the wheel, a movable connection between the brake-shoes, a brake-lever fulcrumed between its arms in said connection, and a connection through a fulcrum-pin between the rail brake-shoe and an arm of said lever.

21. The combination, in a car-brake, of a brake-frame embracing a wheel, a rail brake-shoe supported by one end of the brake-frame, and a wheel brake-shoe supported by the other end of said brake-frame.

22. The combination, in a car-brake, of a brake-frame embracing a wheel and having the space between the ends thereof reduced, a rail brake-shoe supported beneath the reduced space of one end of the brake-frame, and a wheel brake-shoe supported in the reduced space of the other end of said brake-frame.

23. The combination, in a car-brake, of a brake-frame comprising a straight bar on one side thereof and a bar on the other side having an offset therein, said frame embracing a wheel and having the space between the ends of said bars reduced, and brake-shoes supported by the ends of the frame.

24. The combination, in a car-brake, of a brake-block provided with a bottom plate having transverse passages therethrough, a brake-shoe, transverse ribs on the brake-shoe and engaging said passages, lips on the ribs and taking over the sections of the bottom plate, and means for maintaining said lips in engagement with the sections of the bottom plate.

25. The combination, in a car-brake, of a brake-block provided with a bottom plate having transverse passages therethrough, a brake-shoe, transverse ribs on the brake-shoe and engaging said passages, lips on the ribs and taking over the sections of the bottom plate, and filling-pins behind said ribs.

26. The combination, in a car-brake, of a brake-frame, a wheel brake-shoe and a rail brake-shoe supported by the brake-frame, a brake-lever fulcrumed at the intersection of its arms on said brake-frame, and a connection through a fulcrum-pin between an arm of the brake-lever and the rail brake-shoe.

27. The combination, in a car-brake, of a brake-frame, a wheel brake-block located between the bars of said brake-frame and pivoted on a bolt at one end thereof, and a wheel brake-shoe secured to the wheel brake-block by a bolt passing through said shoe and engaging a socket in the wheel brake-shoe.

28. The combination, in a car-brake, of a brake-frame, a wheel brake-shoe supported on one side of a wheel by the brake-frame, a rail brake-shoe supported on the other side of the wheel by the brake-frame, a brake-lever fulcrumed at the intersection of its arms on said brake-frame, and a connection through a fulcrum-pin between an arm of the brake-lever and the rail brake-shoe.

29. The combination, in a car-brake, of a brake-frame, pivoted links supporting the brake-frame, a wheel brake-shoe supported on one side of a wheel by the brake-frame, a rail brake-shoe supported on the other side of the wheel by the brake-frame, a brake-lever fulcrumed at the intersection of its arms on said brake-frame, and a connection through a fulcrum-pin between an arm of the brake-lever and the rail brake-shoe.

30. The combination, in a car-brake, of a brake-frame embracing a wheel, a wheel brake-shoe supported on one side of a wheel by the brake-frame, a rail brake-shoe supported on the other side of the wheel by the brake-frame, a brake-lever fulcrumed at the intersection of its arms on said brake-frame, and a connection through a fulcrum-pin between an arm of the brake-lever and the rail brake-shoe.

31. The combination, in a car-brake, of a brake-frame embracing a wheel, pivoted links supporting the brake-frame, a wheel brake-shoe supported on one side of a wheel by the brake-frame, a rail brake-shoe supported on the other side of the wheel by the brake-frame, a brake-lever fulcrumed at the intersection of its arms on said brake-frame, and a connection through a fulcrum-pin between an arm of the brake-lever and the rail brake-shoe.

32. The combination, in a car-brake, of a brake-frame embracing a wheel, a wheel brake-shoe secured on one side of a wheel to the brake-frame through a pivot, a hanger pivoted to the support thereof and connected with the wheel brake-shoe through a pivot, a rail brake-shoe supported on the other side of the wheel by the brake-frame, links pivoted to their support and to the end of the brake-frame supporting the rail brake-shoe, a brake-lever fulcrumed at the intersection of the arms thereof on the bolt pivoting said links to the brake-frame, and a pivot connection between the load-arm of the lever and the rail brake-shoe.

33. The combination, in a car-brake, of a brake-frame embracing a wheel, a wheel brake-shoe secured on one side of a wheel to the brake-frame through a pivot, a hanger pivoted to its support and connected through a pivot with the wheel brake-shoe, a rail brake-shoe on the other side of the wheel, parallel-acting links pivoted to the brake-frame and connected through pivots with the rail brake-shoe, links pivoted to their support and to the part of the brake-frame from which said rail brake-shoe is supported, a brake-lever fulcrumed at the intersection of the arms thereof on the bolt pivoting the brake-frame-supporting links to said frame, and a pivot connection between the load-arm of the lever and the rail brake-shoe.

34. The combination, in a car-brake, of a brake-frame embracing a wheel and having the space between the ends of the bars thereof reduced, a wheel brake-shoe in the reduced space between said bars at one end of the brake-frame and secured thereto through a pivot, a hanger pivoted to its support and connected through a pivot with the top of the wheel brake-shoe, a rail brake-shoe on the other side of the wheel, parallel-acting links pivoted to the brake-frame and connected through pivots with the rail brake-shoe, links pivoted to their support and inside the bars thereof to the part of the brake-frame from which the rail brake-shoe is supported, a brake-lever between said last-mentioned links and fulcrumed between the arms thereof on the bolt pivoting the brake-frame-supporting links to said frame, and a pivot connection between the load-arm of the lever and the rail brake-shoe.

35. In a car-brake, a brake-shoe adjuster comprising a lower block having an upwardly-inclined surface ending in a downwardly-extending face, and an upper block having an inclined surface adapted to climb the inclined surface of the lower block and ending in an upwardly-extending face adapted to drop in front of the downwardly-inclined face of said lower block, in combination with a hanger supported by the upper block.

36. In a car-brake, a brake-shoe adjuster comprising two blocks, means for changing the relative positions of said blocks, and oppositely-disposed shoulders on the blocks and adapted to engage and interlock the one with the other, whereby one of said blocks is lowered in respect to the other block, in combination with a hanger supported by the upper block.

37. In a car-brake, a brake-shoe adjuster comprising a lower block, a superposed block, means for changing the relative positions of said blocks, and oppositely-disposed shoulders on the blocks and adapted to engage and interlock the one with the other, whereby one of said blocks is lowered in respect to the other block, in combination with a hanger supported by the upper block.

38. In a car-brake, a brake-shoe adjuster comprising a stationary block, a superposed revoluble block, and oppositely-disposed shoulders on the blocks and adapted to engage and interlock the one with the other, whereby the revoluble block is lowered in relation to the stationary block, in combination with a hanger supported by the revoluble block.

39. In a car-brake, a brake-shoe adjuster comprising a stationary tubular block having a cam-surface and shoulder on the top thereof, and a superposed revoluble tubular block having on its lower end the counterpart of the cam-surface and shoulder on said stationary block, in combination with a hanger supported by the revoluble block.

40. The combination, in a car-brake, of a rail brake-shoe, a brake-lever actuating said brake-shoe, a cam device adapted to take up the wear of the rail brake-shoe, and an operating connection between the brake-lever and the rail brake-shoe.

41. The combination, in a car-brake, of a rail brake-shoe, a brake-lever actuating said brake-shoe, an adjuster-frame through which the rail brake-shoe is supported, a stationary cam-block in the adjuster-frame and having a cam-surface and shoulder on the top thereof, a revoluble cam-block on top of the stationary cam-block and having on its lower end the counterpart of the cam-surface and shoulder on the stationary cam-block, and an operating connection between the brake-lever and the revoluble cam-block.

42. The combination, in a car-brake, of a rail brake-shoe, a brake-lever actuating said brake-shoe, an adjuster-frame, a stationary and tubular cam-block in the adjuster-frame and having a cam-surface and shoulder on the top thereof, a revoluble tubular cam-block on top of said stationary cam-block and having on its lower end the counterpart of the cam-surface and shoulder on the stationary cam-block, a hanger passing through the cam-blocks, a nut on the upper threaded end of the hanger, a connection between the hanger and the rail brake-shoe and supporting the same, and an operating connection between the brake-lever and the revoluble cam-block.

43. The combination, in a car-brake, of a rail brake-shoe, a brake-lever actuating said brake-shoe, an adjuster-frame, a stationary and tubular cam-block in the adjuster-frame and having a plurality of cam-surfaces on the top thereof, a revoluble tubular cam-block on top of said stationary cam-block and having on its lower end the counterpart of the cam-surface and shoulders on the stationary cam-block, a hanger passing through the cam-blocks, a nut on the upper threaded end of the hanger, links connected with the hanger, and through which the rail brake-shoe is supported, and an operating connection between the brake-lever and the revoluble cam-block.

44. The combination, in a car-brake, of a rail brake-shoe, a brake-lever actuating said brake-shoe, an adjuster-frame, tubular cam-blocks of the character described, a hanger passing through the cam-blocks and having its upper end threaded, a detent preventing the accidental raising of said hanger, links connected with the hanger and through which the rail brake-shoe is supported, a lever-arm loosely engaging the upper end of the hanger and bearing against a shoulder on the revoluble cam-block, a rod connecting the lever-arm on the hanger and the brake-lever, and a spring acting on the revoluble cam-block to retract the same.

45. The combination, in a car-brake, of a rail brake-shoe, a device for automatically taking up the wear of said brake-shoe and located above the same, a frame located between the rail brake-shoe and the take-up device, links pivoted to the take-up device and to a bolt supported in said frame, and a brake-lever fulcrumed on said bolt and having a pivot connection with the rail brake-shoe.

46. The combination, in a car-brake, of a rail brake-shoe, a device for taking up the wear of said brake-shoe and located above the same, a frame located between the rail brake-shoe and the take-up device, links pivoted to the take-up device and to a bolt supported in said frame, parallel-acting links pivoted to said frame and connected through pivots with the rail brake-shoe, a brake-lever fulcrumed to the bolt supported in said frame and having a connection between the load-arm thereof and the rail brake-shoe, and an operating connection between the power-arm of the brake-lever and the take-up device.

47. The combination, in a car-brake, of a brake-frame embracing a wheel of the car, a wheel brake-shoe supported by a swinging hanger in one end of the frame, a rail brake-shoe supported below the other end of said frame by parallel-acting links pivoted to said frame and connected through pivots with the rail brake-shoe, and a brake-lever fulcrumed between its arms to a bolt located in the brake-frame and having one arm thereof loosely connected through a bolt with the rail brake-shoe, whereby the application of the rail brake-shoe to the rail draws the brake-frame toward the same and applies the wheel brake-shoe to the wheel.

48. The combination, in a car-brake, of a brake-frame embracing a wheel of the car, a wheel brake-shoe supported by a swinging hanger in one end of the frame, a rail brake-shoe supported below the other end of said frame by parallel-acting links pivoted to said frame and connected through pivots with the rail brake-shoe, a device for automatically taking up the wear of the rail brake-shoe, links having their upper ends pivotally connected with the take-up device and their lower ends pivoted on a bolt passing through the brake-frame above the rail brake-shoe, a brake-lever fulcrumed between its arms to said bolt passing through the brake-frame and having the load-arm loosely connected through a bolt with the rail brake-shoe, and an operating connection between the power-arm of the brake-lever and the take-up device.

WILLIAM M. DEAL.

Witnesses:
C. G. BASSLER,
WM. R. GERHART.